United States Patent
Joshi et al.

(10) Patent No.: US 8,209,343 B2
(45) Date of Patent: Jun. 26, 2012

(54) NAMESPACE MAPPING TO CENTRAL STORAGE

(75) Inventors: Kiran Joshi, San Jose, CA (US); Sirish Raghuram, San Jose, CA (US); Bich Cau Le, San Jose, CA (US); Gopala Suryanarayana, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 628 days.

(21) Appl. No.: 12/246,284

(22) Filed: Oct. 6, 2008

(65) Prior Publication Data
US 2010/0088328 A1 Apr. 8, 2010

(51) Int. Cl.
G06F 17/30 (2006.01)
G06F 7/00 (2006.01)
(52) U.S. Cl. .................... 707/758; 711/6; 718/1
(58) Field of Classification Search .......... 707/831
See application file for complete search history.

(56) References Cited

U.S. PATENT DOCUMENTS

| | | | |
|---|---|---|---|
| 6,748,534 B1 | 6/2004 | Gryaznov et al. | |
| 7,136,981 B2 * | 11/2006 | Burch et al. ............. | 711/170 |
| 7,254,596 B2 | 8/2007 | De Spiegeleer | |
| 7,392,261 B2 | 6/2008 | Clark et al. | |
| 7,624,240 B1 * | 11/2009 | Colbert et al. ............ | 711/159 |
| 7,814,307 B2 | 10/2010 | Powell et al. | |
| 7,962,918 B2 | 6/2011 | Schaefer et al. | |
| 2002/0129047 A1 | 9/2002 | Cane et al. | |
| 2005/0114870 A1 | 5/2005 | Song et al. | |
| 2005/0132365 A1 | 6/2005 | Madukkarumukumana et al. | |
| 2007/0112787 A1 | 5/2007 | Burton et al. | |
| 2008/0184225 A1 | 7/2008 | Fitzgerald et al. | |
| 2008/0270483 A1 | 10/2008 | Kumar et al. | |
| 2009/0030957 A1 * | 1/2009 | Manjunath ............. | 709/213 |
| 2009/0150332 A1 | 6/2009 | Zhuang et al. | |
| 2009/0193074 A1 | 7/2009 | Lee | |
| 2009/0198704 A1 | 8/2009 | Landberg | |
| 2009/0276774 A1 | 11/2009 | Kinoshita | |
| 2010/0011200 A1 | 1/2010 | Rosenan | |
| 2010/0036889 A1 | 2/2010 | Joshi et al. | |
| 2010/0037041 A1 | 2/2010 | Joshi et al. | |

OTHER PUBLICATIONS

Ben Pfaff, et al., "Virtualization Aware File Systems: Getting Beyond the Limitations of Virtual Disks," Stanford University, Department of Computer Science, publication is available at http://www.stanford.edu/~blp/papers/ventana.pdf, (May 2006).

* cited by examiner

*Primary Examiner* — Sathyanarayan Pannala

(57) ABSTRACT

A file management system includes a host computer having one or more virtual machines, a switching layer computer configured to manage a namespace map for the virtual machines in the host computer, and a central storage unit. The host computer is connected indirectly to the central storage unit through an in-band IO path that includes the switching layer computer and directly to the central storage unit through an out-of-band IO path. When a virtual machines issues a file operation, a file operation including a data operation is routed to the central storage unit along an out-of-band IO path and a file operation including a metadata operation is routed to the central storage unit along an in-band IO path that includes the switching layer computer.

18 Claims, 5 Drawing Sheets

NAMESPACE MAPPING TO CENTRAL STORAGE

BACKGROUND OF THE INVENTION

In computer systems, a file system maintains a namespace that contains all of the filenames of files that it manages. When an application needs to perform an input/output (IO) operation on a file, it accesses the file from storage by specifying the filename contained in the namespace that is associated with the file.

In a distributed file system where different computer systems access files that are stored in central storage, a namespace map provides a mapping from a computer system's local namespace to the namespace that is maintained for files in the central storage. For example, a file area network (FAN), also known as network attached storage virtualization, file switch, and network file management, is a storage virtualization solution that sits logically between applications and the central storage and virtualizes the application's perspective of storage. With this arrangement, FAN can be used to centrally manage data.

A virtualization aware file system, known as Ventana, extends a conventional distributed file system to virtual machine environments. Ventana combines the sharing benefits of a distributed file system with versioning, access control, and disconnected operation features that are available with virtual disks. A detailed description of Ventana is provided in a publication from Stanford University, Department of Computer Science, authored by Ben Pfaff, et al. The publication is entitled "Virtualization Aware File Systems: Getting Beyond the Limitations of Virtual Disks."

SUMMARY OF THE INVENTION

One or more embodiments of the invention provide a distributed file system for virtual machine environments with improvements in data transfer speed and namespace mapping during execution of file operations. A file system according to an embodiment of the invention includes a host computer having one or more virtual machines configured therein, and a switching layer computer connected to the host computer and configured to manage a namespace map for the virtual machines in the host computer, and a central storage unit. The host computer is connected indirectly to the central storage unit through an in-band IO path that includes the switching layer computer and directly to the central storage unit through an out-of-band IO path.

A method for managing file operations in such a file system is also provided. According to one embodiment, this method includes the steps of receiving a file operation from a virtual machine, distinguishing the file operation between a data operation, such as a read or write operation, and a metadata operation, such as file create or file delete, and selectively routing the data operation to the central storage unit along the out-of-band IO path and the metadata operation to the switching layer computer along the in-band IO path.

According to another embodiment, the method for managing file operations includes the steps of maintaining a primary namespace map using the switching layer computer and a partial namespace map using the host computer, receiving a file operation from a virtual machine, mapping a filename specified in the file operation to a filename recognized by the central storage unit using the primary namespace map, updating the partial namespace map, and routing the file operation to the central storage unit.

DETAILED DESCRIPTION

Figure 1:
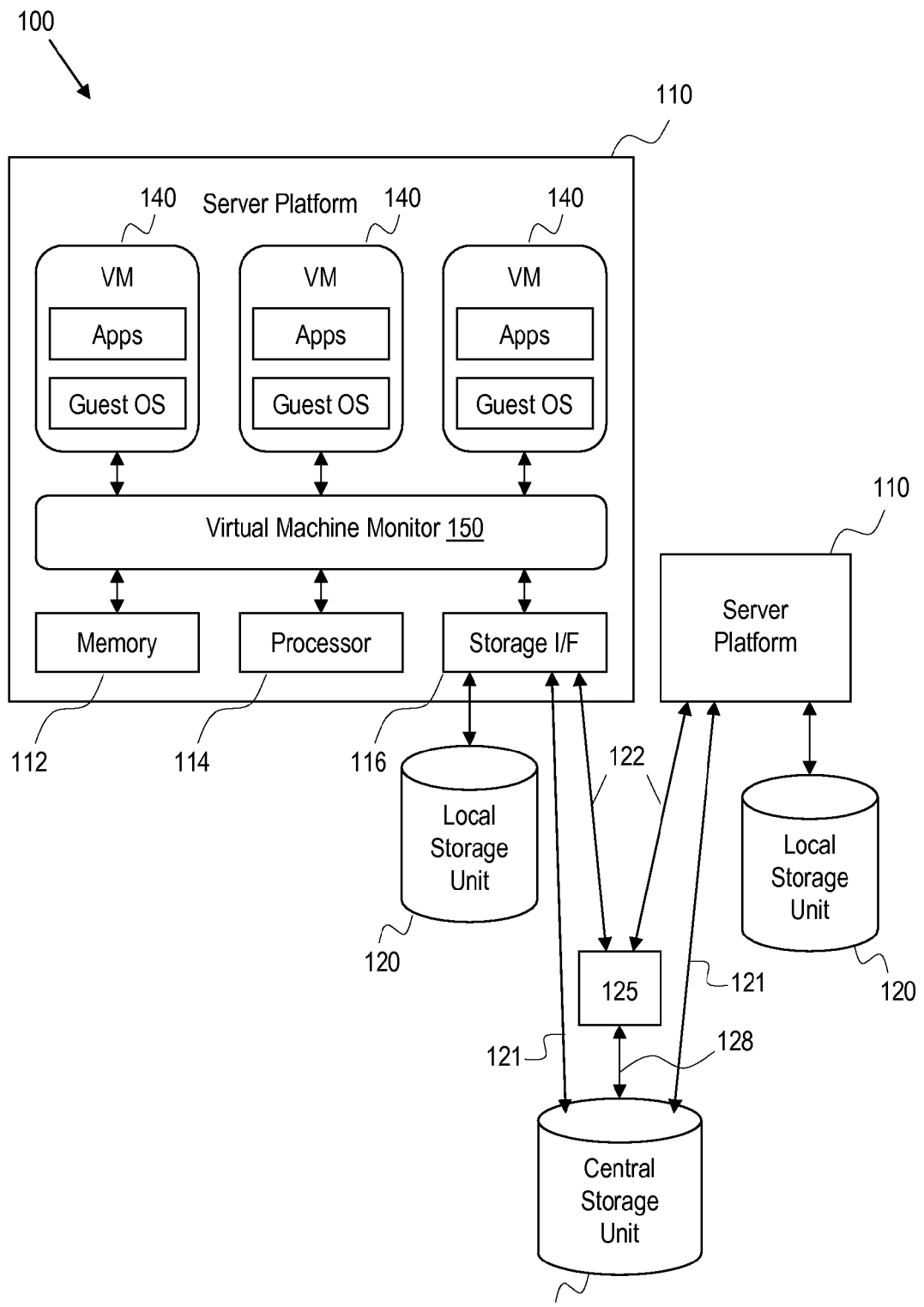
FIG. 1 is a functional block diagram of a computer system in which one or more embodiments of the invention may be practiced.

FIG. 1 is a functional block diagram of a computer system 100 in which one or more embodiments of the invention may be practiced. Computer system 100 includes server platforms 110 (also referred to herein as a "host computer"), a local storage unit 120 for each server platform, and a central storage unit 130 that is shared by server platforms 110. Local storage unit 120 and central storage unit 130 may be implemented as network attached storage (NAS) or storage area network (SAN) arrays. Local storage unit 120 is dedicated to and provides storage for the server platform to which it is connected, and central storage unit 130 provides shared storage to all server platforms 110. Central storage unit 130 is implemented as one or more storage servers.

A server platform is connected to central storage unit 130 through an out-of-band IO path 121 and an in-band IO path that includes IO path 122, a switching layer computer 125 and IO path 128. Switching layer computer 125 carries out namespace mapping as will be described below. IO paths 121, 122, 128 are communication paths that are based on a file sharing protocol, such as NFS (Network File System) and CIFS (Common Internet File System).

Each of server platforms 110 has conventional components of a server computer, and may be implemented as a cluster of multiple server computers. Each server platform has configured therein one or more virtual machines 140 that share hardware resources of the server platform, such as system memory 112, processor 114 and storage interface 116. Examples of storage interface 116 are a host bus adapter and a network file system interface. Virtual machines 140 run on top of a virtual machine monitor 150, which is a software interface layer that enables sharing of the hardware resources of the server platform by virtual machines 140. Virtual machine monitor 150 may run on top of the server platform's operating system or directly on hardware components of the server platform. Together, virtual machines 140 and virtual machine monitor 150 create virtualized computer systems that give the appearance of being distinct from the server platform and from each other. Each virtual machine includes a guest operating system and one or more guest applications. The guest operating system is a master control program of the virtual machine and, among other things, the guest operating system forms a software platform on top of which the guest applications run. A virtual disk for each of the virtual machines 140 is maintained within local storage unit 120.

Figure 2:
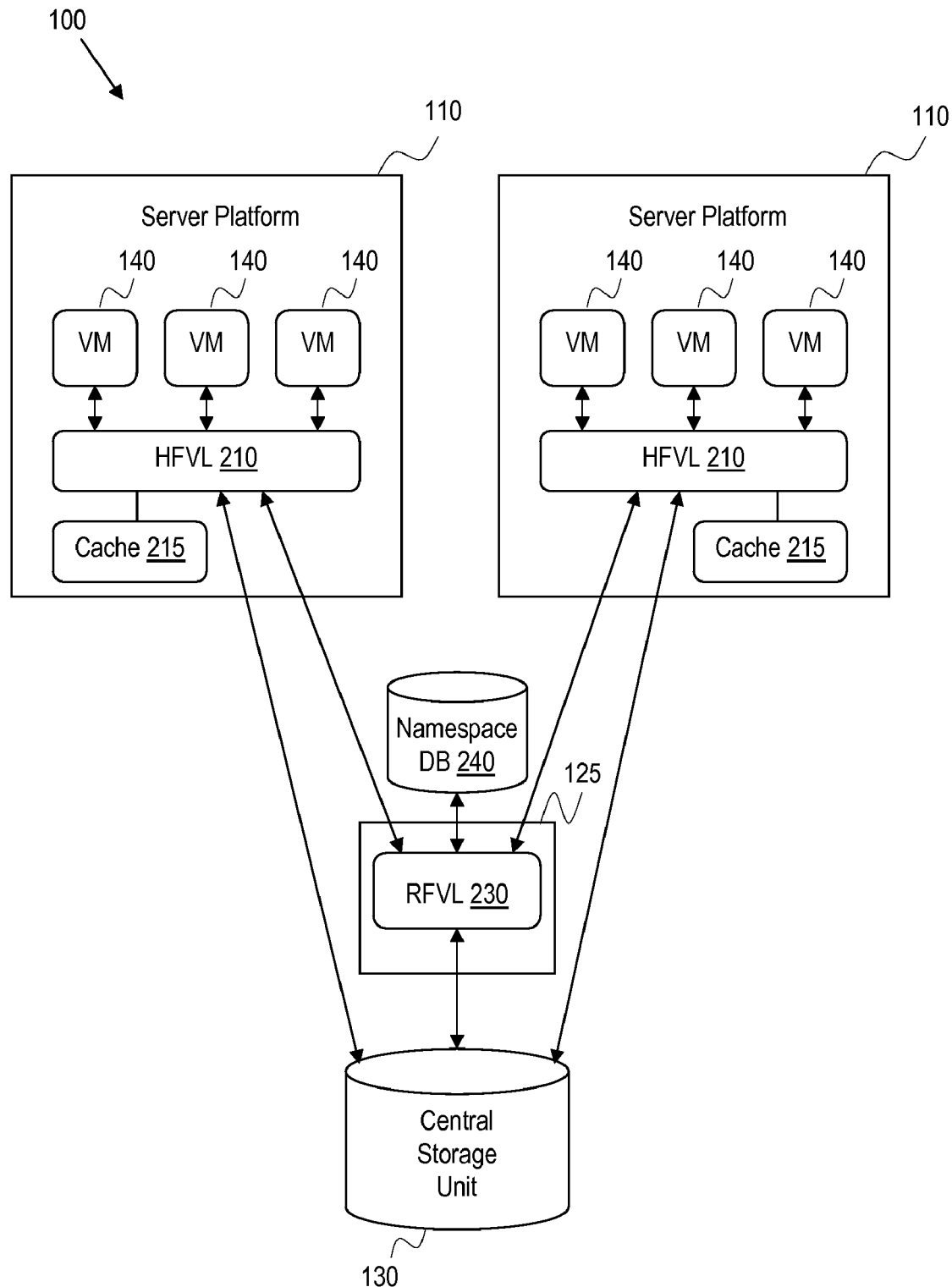
FIG. 2 illustrates various components of the computer system of FIG. 1 that carry out namespace mapping.

FIG. 2 illustrates various components of the computer system of FIG. 1 that carry out namespace mapping. These components include a host file virtualization layer (HFVL) 210 implemented in each server platform and a remote file virtualization layer (RFVL) 230 implemented in switching layer computer 230. A cache memory unit 215 is provided to support namespace mapping that is carried out by the server platform and a namespace database 240 is provided to support namespace mapping that is carried out by switching layer computer 125. Namespace database 240 is used to persistently store the primary namespace map for computer system 100 and contains all of the mapping information needed to correctly map filenames used by VMs 140 to filenames used by central storage unit 130. Cache memory unit 215 contains only a portion of the primary namespace map.

HFVL 210 is a software component that resides on an operating system for the server platform. HFVL 210 acts as a gateway between a file system driver running in the guest operating system of VMs 140 and central storage unit 130. It also interacts with RFVL 230 to implement guest namespace virtualization and employs cache memory unit 215 to cache namespace maps as they are resolved by RFVL 230.

RFVL 230 is a software component that with the help of namespace database 240 implements guest namespace virtualization. Guest namespace virtualization is a mechanism to construct and control a virtual tree of files and folders seen by the VM. It comprises of a map between filenames and directory tree structure seen by the VM and their location on central storage 130. There need not be an exact mapping of a file path that a guest operating system can operate on and the file path on central storage 130. For example, a guest file "c:/foo/bar.txt" can be mapped to "/server/share/snapshot/1/2/3/xyz.lmnop" on the central storage. RFVL 230 stores this mapping information in namespace database 240 and uses it to resolve file paths referenced by the VM.

The guest namespace can be constructed using two types of virtualization techniques, static and dynamic. Static virtualization is that part where the namespace map cannot be altered while the guest operating system of the VM is running. This prevents newer versions of files getting introduced in the guest operating system while they are in use and thus breaking runtime dependencies. Dynamic virtualization is a mechanism where names and directory trees can be added or modified in the guest namespace while the guest operating system of the VM is running. This permits applications to be dynamically pushed to the VM or removed from the VM if they are no longer required. Dynamic virtualization is achieved by updating the namespace map in namespace database 240 and invalidating the namespace maps stored in cache memory unit 215.

Figure 3:
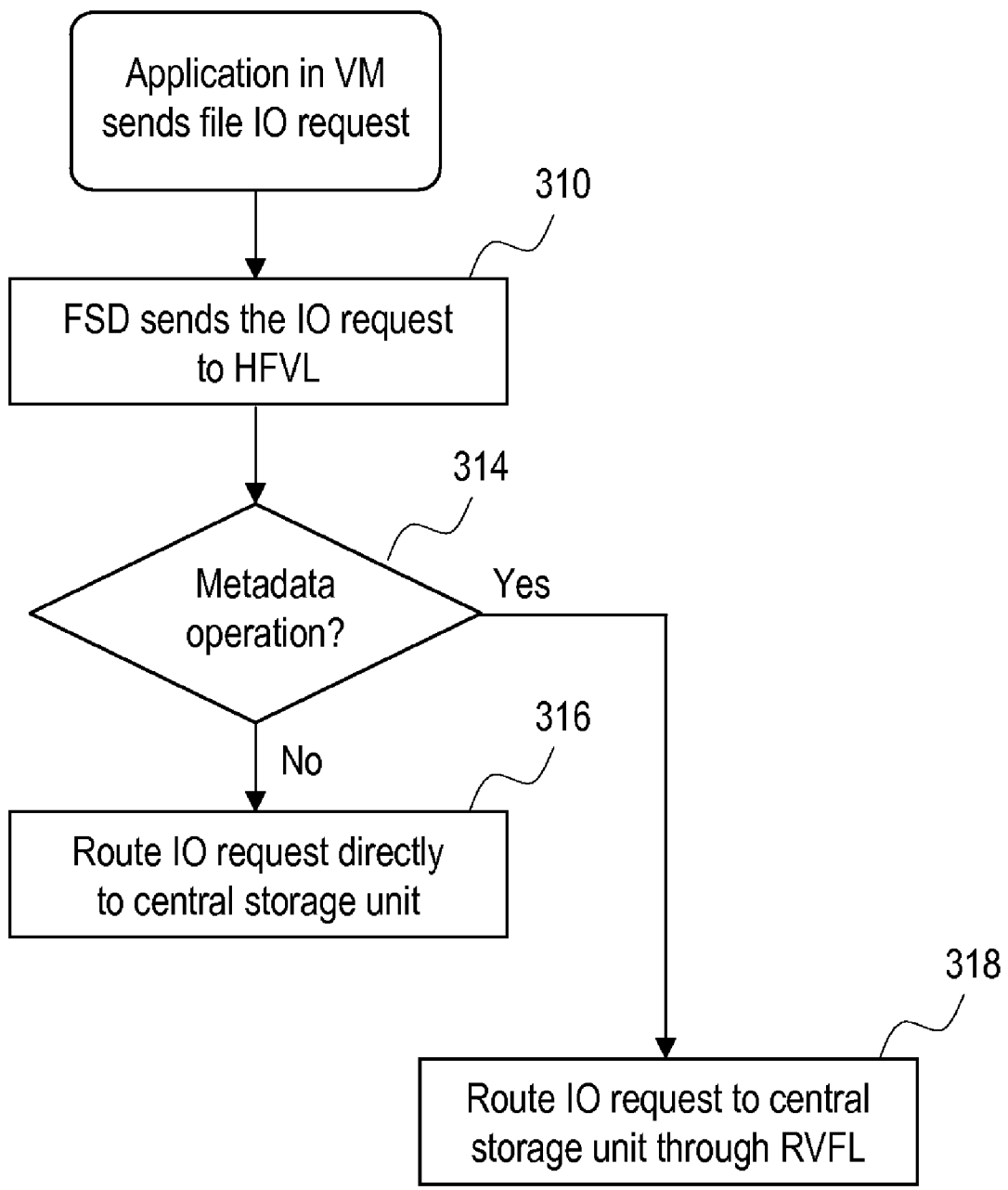
FIG. 3 illustrates a process for selectively routing a file IO request to a central storage unit or a switching layer, according to an embodiment of the invention.

FIG. 3 illustrates a process for selectively routing a file IO request to a central storage unit or a switching layer, according to an embodiment of the invention. This process is carried out by the server platform that is hosting one or more virtual machines in response to a file IO request made by an application running in a virtual machine. At step 310, the file system driver (FSD) of the virtual machine sends the file IO request to HFVL 210. HFVL 210 evaluates the file IO request and determines whether the file IO request is a data operation or a metadata operation (step 314). A data operation includes a read operation and a write operation. A metadata operation includes file open, file create, file delete, rename, set file attributes, create link, and other file operations known in the art that require a file path. If the file IO request is a data operation, it is routed directly to central storage unit 130 through IO path 121 (step 316). If the file IO request is a metadata operation, it is routed to RFVL 230 of switching layer computer 220 through IO path 122 (step 318).

Figure 4:
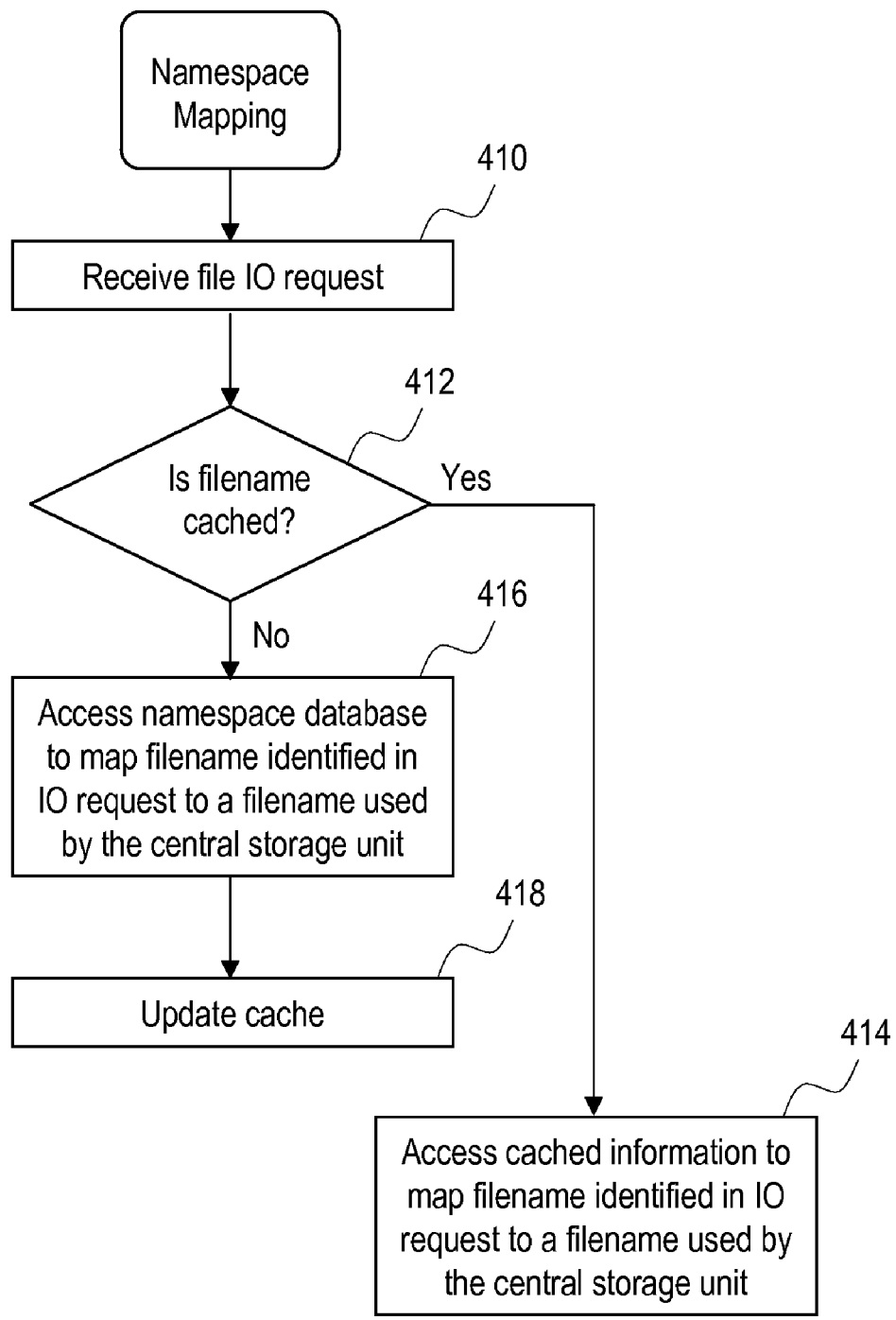
FIG. 4 illustrates a process for namespace mapping according to an embodiment of the invention.

FIG. 4 illustrates a process for namespace mapping according to an embodiment of the invention. This process is initiated at HFVL 210 in response to a file IO request (step 410). At step 412, HFVL 210 determines if the namespace mapping information for the filename specified in the file IO request is stored in cache memory unit 215. If so, the cached mapping information is accessed and used to resolve the filename used by central storage unit 130 (step 414). If the filename specified in the file IO request is not stored in cache memory unit 215, step 416 is carried out by RFVL 230. At step 416, RFVL 230 accesses namespace database 240 and maps the filename specified in the file IO request to a filename used by central storage unit 130. This mapping information is then returned to HFVL 210 and HFVL 210 updates cache memory unit 215 with this information. During dynamic namespace virtualization, when RFVL 230 updates namespace map 240, RFVL 230 signals each HVFL 210 to invalidate the namespace maps stored in cache memory unit 215.

In the embodiments described above, guest applications and guest operating system of a virtual machine use the file system driver for all of its file access needs. The file system driver forwards these requests to HFVL 210. The following are some examples of how HFVL 210 handles some of these requests.

Open File. HFVL 210 looks into cache memory unit 215 to resolve the VM specific file path to file path of central storage unit 130. If found, HFVL 210 uses the cached information and interacts with central storage unit 130 to open the file and notifies RFVL 230 about opening of the file so that namespace database 240 can be updated accordingly. If not, HFVL 210 communicates with RFVL 230 to resolve the file path. It then adds this entry to its cache memory unit 215. For example, an application executing in a VM tries to open c:\foo\bar.txt. This open call gets routed to HFVL 210 via the file system driver. HFVL 210 examines its cache memory unit 215 to resolve \foo\bar.txt. If this information is not available, it sends the name resolution request to RFVL 230. RFVL 230 in turn looks into namespace database 240 for the VM specific namespace map and resolves the path to \server1\share3\snapshot7\vm9\foo\bar.txt and returns this path to HFVL 210. HFVL 210 then forwards the open request to server1 of central storage unit 130 with path \share3\snapshot7\vm9\foo\bar.txt.

Create File. HFVL 210 notifies RFVL 230 about a request to create new file/directory. Based on which VM is creating the new file/directory and the configuration policies for that VM, RFVL 230 chooses a file server/share and a system wide unique file/directory name. It then creates a mapping entry between the file/directory name that the VM intends to create and the name RFVL 230 has chosen for that filename in namespace database 240. RFVL 230 then returns to the requesting HFVL 210 its chosen name.

Read/Write. Before a read or write operation can be carried out, a file is opened in the manner described above. This means that the file path to central storage unit 130 has been resolved and stored in system memory 112 and/or cache memory unit 215. This file path is used by HFVL 210 to transfer data to/from central storage unit 130 directly through IO path 121 without involving RFVL 230.

File Close. HFVL 210 notifies RFVL 230 about the closing of the file so that namespace database 240 can be updated accordingly.

File Delete. HFVL 210 notifies RFVL 230 about the deletion of the file. RFVL 230 deletes the mapping between the VM specific file path to file path of central storage unit 130 from namespace database 240.

Namespace mapping according to one or more embodiments of the invention allows sharing of files between VMs, whether the VMs are running on the same host computer or different host computers. Also, updates to the primary namespace map maintained in namespace database 240 can be made to reflect changes in file sharing. For example, if two VMs are created from the same template, they initially share all of the files. If a VM tries to write to a file, the shared file is copied to a private file (one that is not shared) and the write operation is carried out on the private file. The private file is then assigned to the VM that is writing to it.

The namespace map also supports file deduplication process. This process can be carried out within central storage unit 130 or by any other server that has access to central storage unit 130, such as server platform 110 or switching layer computer 125, and entails comparing files stored in central storage unit 130 to determine those files that are identical. Once files are determined to be identical, APIs in RFVL 230 are invoked to change the namespace maps so that multiple VM specific file paths point to each of the files that are found to be identical in central storage unit 130.

Figure 5:
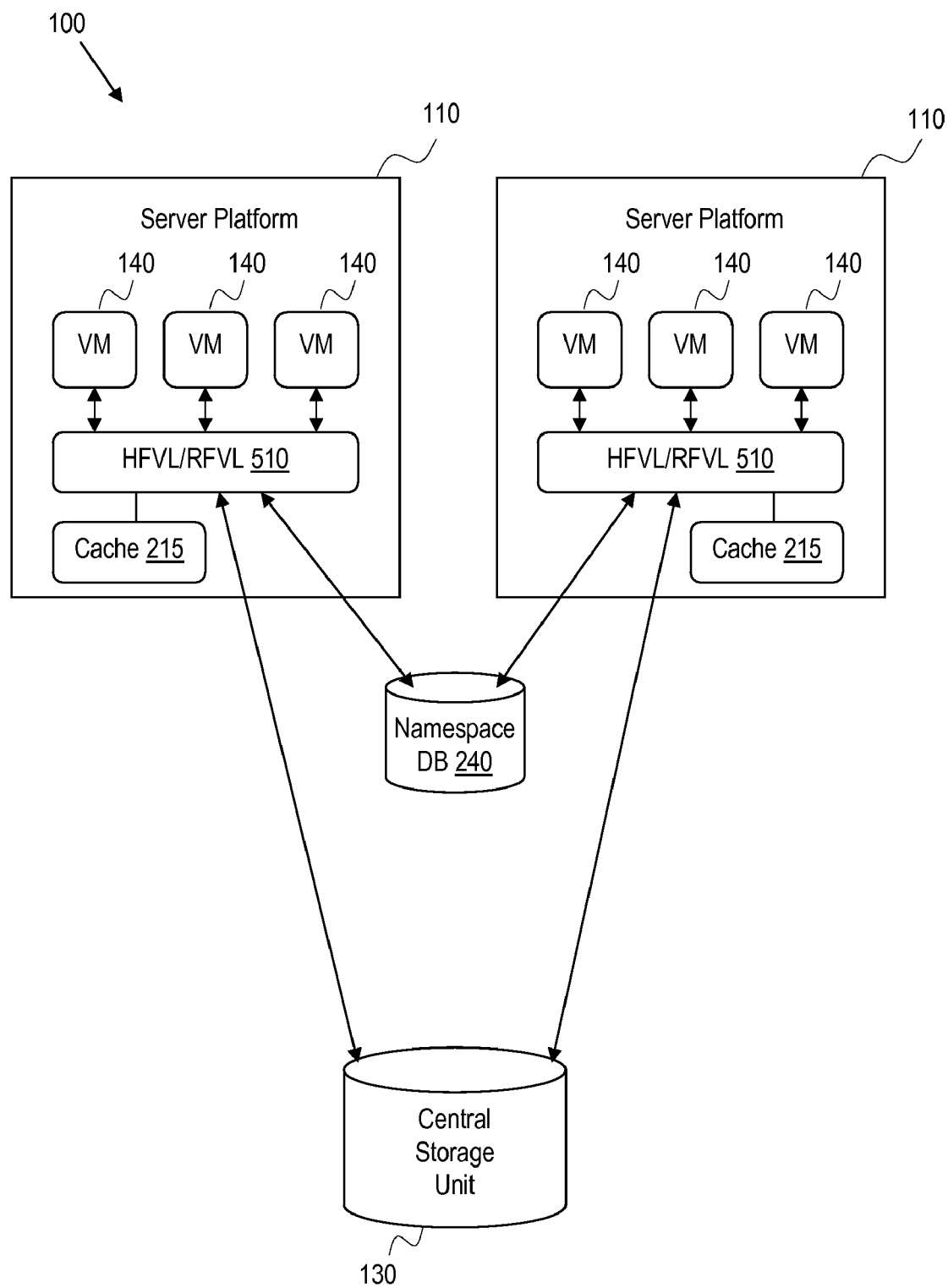
FIG. 5 illustrates an alternative embodiment of the invention.

FIG. 5 illustrates an alternative embodiment of the invention. In this embodiment, the functions of HFVL 210 and RFVL 230 are carried out by a single software layer, HFVL/RFVL 510, which is implemented in each server platform 110 and communicates with namespace database 240. An in-band IO path in this embodiment includes namespace database 240, whereas an out-of-band IO path in this embodiment does not include namespace database 240.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention (s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for managing file operations in a system including a host computer having one or more virtual machines configured therein, a central storage unit connected to the host computer along a first path, and a switching layer computer connected to the host computer along a second path, the method comprising:
   maintaining a partial namespace map using the host computer, wherein a primary namespace map is maintained by the switching layer computer;
   receiving a metadata file operation from a virtual machine;
   routing, by the host computer, the metadata file operation to the switching layer computer through the second path;
   receiving a mapping of a filename specified in the metadata file operation to a filename recognized by the central storage unit using the primary namespace map in response to the routing of the metadata file operation to the switching layer computer;
   updating, by the host computer, the partial namespace map based on said mapping;
   receiving a data file operation from the virtual machine; and routing, by the host computer, the data file operation to the central storage unit along the first path using the updated mapping in the partial namespace map.

2. The method according to claim 1, wherein the data the operation includes read and write operations.

3. The method according to claim 1, wherein the metadata file operation includes a file operation that requires a file path.

4. The method according to claim 1, further comprising:
mapping a filename specified in a subsequent metadata file operation to a filename recognized by the central storage unit.

5. The method according to claim 4, wherein the filename specified in the subsequent metadata file operation is transmitted from the host computer to the switching layer computer, wherein the switching layer computer updates a mapping in the primary namespace based on the metadata file operation.

6. The method according to claim 5, wherein the subsequent metadata file operation comprises a file deletion or file closing operation.

7. The method according to claim 1, wherein said mapping is carried out by the host computer using mapping information stored in the partial namespace map in a memory unit of the host computer.

8. The method according to claim 7, wherein the memory unit comprises a cache memory.

9. The method according to claim 1, wherein the data file operation routed to the central storage unit includes the filename recognized by the central storage unit.

10. The method according to claim 1, wherein the primary namespace map defines a mapping of filenames used by the virtual machines to filenames used by the central storage unit, and, in the primary namespace map, different filenames of the virtual machines map to the same filename used by the central storage unit.

11. The method according to claim 1, further comprising:
running a file deduplication program; and
updating the primary namespace map based on results from running the file deduplication program.

12. The method according to claim 1, wherein the primary namespace map is updated when a file on the central storage unit that is shared by multiple virtual machines is modified by one of the multiple virtual machines.

13. A file management system comprising:
a host computer having one or more virtual machines configured therein;
a switching layer computer connected to the host computer and configured to manage a primary namespace map for the virtual machines in the host computer, the primary namespace map defining a mapping of filenames used by the virtual machines in the host computer to filenames used by the central storage unit; and
a central storage unit connected to the host computer along a first path,
wherein the host computer is connected to the switching layer computer along a second path, the host computer configured to:
maintain a partial namespace map using the host computer;
receive a metadata file operation from a virtual machine;
route the metadata file operation to the switching layer computer through the second path;
receive a mapping of a filename specified in the metadata file operation to a filename recognized by the central storage unit using the primary namespace map in response to the routing of the metadata file operation to the switching layer computer;
update the partial namespace map based on said mapping;
receive a data file operation from the virtual machine; and
route the data file operation to the central storage unit along the first path using the updated mapping in the partial namespace map.

14. The system according to claim 13, wherein the host computer is programmed to selectively route file operations that are metadata operations to the switching layer computer and file operations that are data operations to the central storage unit.

15. The system according to claim 14, wherein the host computer includes a memory unit in which at least a portion of the partial namespace map is stored.

16. The system according to claim 13, further comprising a database managed by the switching layer computer with which the primary namespace map is maintained.

17. The system according to claim 16, wherein one of the host computer, the switching layer computer, and the central storage unit is programmed to execute a file deduplication program and the switching layer computer uses results of the file deduplication program to update the primary namespace map.

18. The system according to claim 13, further comprising:
an additional host computer having one or more virtual machines configured therein, connected to the switching layer computer and the central storage unit,
wherein the primary namespace map managed by the switching layer computer also provides a mapping of filenames used by the virtual machines in the additional host computer to filenames used by the central storage unit.

* * * * *